United States Patent [19]

Martin

[11] Patent Number: 4,534,928
[45] Date of Patent: Aug. 13, 1985

[54] MOLDING PROCESS USING ROOM TEMPERATURE CURING SILICONE COATINGS TO PROVIDE MULTIPLE RELEASE OF ARTICLES

[75] Inventor: David L. Martin, Midland, Mich.

[73] Assignee: Dow Corning Corporation, Midland, Mich.

[21] Appl. No.: 562,760

[22] Filed: Dec. 19, 1983

[51] Int. Cl.$^3$ .............................. B28B 7/36
[52] U.S. Cl. ................... 264/334; 264/338; 106/38.22; 524/731; 524/860; 524/863; 525/475; 528/17; 528/18; 528/19; 528/33; 528/34; 427/133
[58] Field of Search ............. 106/38.22, 287.14; 427/133, 154; 249/115; 264/334, 338; 524/268, 860; 528/17, 18, 19, 33, 34; 624/731, 860, 863; 525/475

[56] References Cited

U.S. PATENT DOCUMENTS

| | | | |
|---|---|---|---|
| 2,811,408 | 10/1957 | Braley | 18/47 |
| 3,151,099 | 9/1964 | Ceyzeriat et al. | 260/46.5 |
| 3,161,614 | 12/1964 | Brown et al. | 260/46.5 |
| 3,334,067 | 8/1967 | Weyenberg | 260/46.5 |
| 3,492,394 | 1/1970 | Heine | 264/297 |
| 3,684,756 | 8/1972 | Brooks | 106/38.22 X |
| 4,244,912 | 1/1981 | Battice | 264/338 |
| 4,318,939 | 3/1982 | Wong | 528/34 X |
| 4,357,443 | 11/1982 | White et al. | 528/34 X |
| 4,359,340 | 11/1982 | Comper et al. | 106/38.22 |

FOREIGN PATENT DOCUMENTS

| | | | |
|---|---|---|---|
| 624114 | 7/1961 | Canada | 264/338 |
| 2259802 | 6/1974 | Fed. Rep. of Germany | 528/34 |
| 1220381 | 1/1971 | United Kingdom | 106/38.22 |
| 2021609 | 12/1979 | United Kingdom | 264/338 |

*Primary Examiner*—Joseph L. Schofer
*Assistant Examiner*—Fred M. Teskin
*Attorney, Agent, or Firm*—James E. Bittell

[57] ABSTRACT

An improved molding process is provided which comprises treating a mold surface with certain curable silicone compositions to improve the release of molded articles from the mold. The silicone mold release composition is obtained by mixing predominately hydroxyl terminated polydimethylsiloxane, an alkoxysilane such as methyltrimethoxysilane, a metal alkoxide such as tetraalkyltitanate and a non-reactive, volatile solvent. The composition is stable if stored in containers that exclude moisture, but cures when exposed to moisture. Molds with surfaces coated by these compositions provide easy release of many successively molded articles such as high resiliency polyurethane foam cushions for automobiles.

8 Claims, No Drawings

MOLDING PROCESS USING ROOM TEMPERATURE CURING SILICONE COATINGS TO PROVIDE MULTIPLE RELEASE OF ARTICLES

BACKGROUND OF THE INVENTION

This invention relates to an improved process for molding articles. More specifically, this invention relates to an improved mold-coating step wherein a one component, room temperature curing silicone release composition is applied to the mold surfaces to provide multiple release of articles therefrom.

During a molding process, the solid article produced often sticks to the shape-determining surfaces of the mold thereby interfering with its separation from the mold. This sticky problem is particularly prevalent in molding processes which use liquid, organic molding compositions which are curable to the solid state, such as polyurethanes, unsaturated polyesters and polyepoxides. The liquid state of the molding composition allows it to achieve intimate contact with, and even wet, the shape-determining surfaces of the mold, thereby favoring adhesion of the molded article to said surfaces by a physical process. The curing process of the molding composition is an aggressive chemical process which has the potential of involving the shape-determining surfaces of the mold to some extent, thereby further favoring adhesion of the molded article to said surfaces by a chemical process. For these reasons the molding of articles from curable liquid compositions presents release problems which are much more severe than those encountered during the molding of non-curing compositions, such as thermoplastic materials. Furthermore, in a closed-mold process, wherein the confined curing liquid composition may be subjected to pressure, such as in the preparation of high-resiliency polyurethane foam articles, such as automobile seat cushions, furniture upholstery and impact pads, said adhesion-favoring processes are accentuated.

For over twenty years silicone compositions have been used as mold release agents. However, several problems have been associated with silicones which have restricted their commercial utility especially in the area of multiple release for high resiliency polyurethane foam articles. Uncured silicone compositions, such as polysiloxane waxes, greases and fluids, transfer to the molded article during demolding and need to be frequently reapplied to the mold. Such compositions containing uncured organopolysiloxane fluid also have a tendency to defoam polyurethane foam compositions at the mold surface and produce an undesirable skin on the molded article.

Cured silicone compositions, while not being transferable, have lacked sufficient abrasion-resistance, either because they are not tough enough or because they do not adhere sufficiently to the mold, so that they also need to be frequently reapplied. Potentially more permanent silicone compositions have failed because components in the molding composition act as inhibitors to prevent the cure of the silicone release composition when it is applied to mold surfaces. In still other cases, catalysts in the molding composition have interacted with the silicone release composition to rapidly alter the silicone surface so that the surface characteristics of successively molded articles rapidly deteriorate.

Braley, U.S. Pat. No. 2,811,408, teaches that a resin of trimethylsiloxane units and $SiO_2$ units, optionally containing an organopolysiloxane, provides excellent release of articles molded from organic and organosilicon plastics when applied to the surface of the mold. No provision is made for curing the optional organopolysiloxane when used, and transfer from the mold surface to the molded article will occur.

Oppliger, Canadian Pat. No. 624,114 teaches that cured polydimethylsiloxane coatings can be employed as a release agent on molds for conventional polyurethane foam articles. Specifically, Oppliger describes compositions in which polydimethylsiloxane fluids are cured by crosslinking agents such as methylhydrogensiloxanes, alkylsilicates and alkylpolysilicates using as catalysts organotin salts of carboxylic acids. These compositions can be commercialized only as two part systems because of the limited pot life after mixing the components.

Brooks, U.S. Pat. No. 3,684,756 discloses a resinous mold release composition composed of methyl-terminated polydimethylsiloxane, a partially methoxylated methyl and propyl polysiloxane resin, and a curing agent for the resin such as tetraalkyl titanates or organotin salts of carboxylic acids. While this composition is said to give multiple releases of plastic articles from a mold treated therewith, the methyl-terminated polydimethylsiloxane possesses no curing sites and is not cured in or cocured with the resin. Transfer of the uncured methyl-terminated polydimethylsiloxane from the mold surface to the surface of the molded article is likely, thus leading to the problems of transfer and defoaming discussed above.

Battice, U.S. Pat. No. 4,244,912 teaches a mold release composition composed of vinyl-endblocked polydimethylsiloxane, a xylene-soluble vinyl-containing resinous polysiloxane, a methylhydrogenpolysiloxane crosslinking agent, and a platinum hydrosilylation catalyst. The curing of the polydimethylsiloxane into the resin system avoids the problems of transfer and defoaming, but the platinum catalyst of this composition is easily inhibited by amines and other components of the molding compositions so that reliable cures have not always been obtainable in some molding operations.

Heine, U.S. Pat. No. 3,492,394 teaches the application of organic solvent solutions of perfluoroalkyltrialkoxysilane to mold surfaces to provide durable release coatings. It is suggested that the hydrolyzable groups react with adventitious water on the mold surfaces to form cured films.

Ceyzeriat et al., U.S. Pat. No. 3,151,099 teach silicone compositions that are stable in the absence of moisture but cure spontaneously upon exposure to moisture. The compositions are prepared from hydroxyl terminated polydimethylsiloxane fluids, a silicic ester such as ethylorthosilicate, and a titanate or zirconate ester such as tetrabutyltitanate. Ceyzeriat et al. do not suggest that the compositions can be used as mold release coatings, in contrast they state that the compositions are suitable especially for sticking various articles such as Bakelite, metals, masonry, wood and glass.

Brown et al., U.S. Pat. No. 3,161,614 also teaches silicone compositions that are stable in the absence of moisture but cure spontaneously upon exposure to moisture. The compositions are composed of polydimethylsiloxane terminated by a siloxane unit having at least two alkoxy substituents and a curing catalyst such as titanium esters.

Weyenberg, U.S. Pat. No. 3,334,067 teaches a one part silicone composition that is stable in the absence of moisture but spontaneously cures in the presence of moisture. The compositions are prepared by mixing in the absence of moisture, a hydroxy terminated polydimethylsiloxane, methyltrimethoxysilane, and a beta-dicarbonyl titanium chelate compound. Weyenberg teaches that the use of other titanium compounds results in substantial increases in viscosity when hydroxylated siloxane is first mixed with the titanium compound such that stable mixtures can not be reliably prepared even in the absence of moisture.

It is an object of this invention to provide an improved process for molding articles which permits the release of multiple articles between successive applications of a release coating to the mold. It is another object of this invention to provide a one part mold release composition that is stable in the absence of moisture but spontaneously cures when applied to the mold surface and exposed to atmospheric moisture. It is also an object of this invention to provide a mold release coating that does not transfer from the mold surface to the molded article. It is also an object of this invention to provide a mold release coating which will not defoam polyurethane foam during the molding process.

SUMMARY OF THE INVENTION

Applicant has discovered an improved method of molding articles wherein a specific moisture curable silicone composition is applied to the shape-determining surface of the mold and thereafter cured on that surface. The cured silicone coating provides multiple releases of articles successively formed in the mold and thereby significantly improves the efficiency of the molding operation by reducing the frequency of application of mold release agents.

The mold release composition is obtained by mixing components consisting essentially of a polydimethylsiloxane represented by the general formula $Y[(CH_3)_2SiO]_kH$ in which Y is a methyl or hydroxyl radical with the stipulation that at least 80 percent of Y are hydroxyl radicals and k has an average value greater than 20; an alkoxysilane represented by the formula $(RO)_nSiR'_{4-n}$ wherein R is a methyl, ethyl, propyl or methoxyethyl radical, R' is a monovalent hydrocarbon or halogen substituted hydrocarbon radical having from 1 to 4 carbon atoms, and n has a value of 3 or 4; a metal alkoxide selected from the group consisting essentially of tetraalkyltitanates, tetraalkylgermanates, tetraalkylzirconates and vanadium trialkoxide oxides; and a non-reactive, volatile organic solvent which is substantially free of water. The components are mixed in amounts of 25 to 98 parts by weight of polydimethylsiloxane, 1.5 to 65 parts by weight of alkoxysilane, and 0.3 to 18 parts by weight of metal alkoxide for every 100 parts by weight of these three components combined.

DETAILED DESCRIPTION OF THE INVENTION

The invention is an improved method of molding articles comprising placing a molding composition in a mold, converting the molding composition to a solid molded article and thereafter separating the solid molded article from the mold, the improvement comprising applying to at least one shape-determining surface of the mold, and thereafter curing, before the molding composition is placed in contact therewith, a silicone mold release composition which is stable if stored in containers that exclude moisture, but which cures when exposed to moisture. The silicone mold release composition of this invention is a mixture of components consisting essentially of (I) a polydimethylsiloxane, (II) an alkoxysilane, (III) a metal alkoxide and (IV) a non-reactive, volatile organic solvent.

The polydimethylsiloxanes (I) useful in this invention are represented by the general formula $Y[(CH_3)_2SiO]_kH$

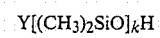

in which Y is a methyl or hydroxyl radical with the stipulation that at least 80 percent of Y are hydroxyl radicals and k has an average value greater than 20. The polydimethylsiloxanes (I) are well known hydroxylated siloxanes that can be prepared by conventional methods for condensation polymerization of organosilanes.

The chain length of the siloxane polymer is not critical so long as the average number of siloxane units per polymer molecule is at least 20. There is no critical upper limit known for the chain length of the polydimethylsiloxanes that are useful. Thus, for example, the hydroxylated siloxane can vary from thin fluids to non-flowable gums. The particular chain length or viscosity of polydimethylsiloxane that is selected for the release composition will depend upon whether toughness or easy release is most important in the particular molding operation in which the composition is to be used. Generally it has been found that the higher viscosity, longer chain length siloxanes provide tougher coatings. On the other hand, the shorter, lower viscosity siloxanes generally provide coatings that release molded articles more easily but are less tough than coatings containing the longer, higher viscosity siloxanes.

Accordingly, it is often preferred to employ a mixture of lower and higher molecular weight siloxanes in the compositions used in this invention. A preferred mixture of siloxanes contains 5 to 40 percent by weight of a siloxane wherein the average value of k in the general formula for (I) is in the range of 25 to 75 and 60 to 95 percent by weight of a siloxane wherein the average value of k in the general formula for (I) is in the range of 300 to 1000. For example a siloxane mixture providing an excellent blend for easy release and durability contains 15 weight percent of a siloxane with k averaging about 31 and 85 weight percent of a siloxane with k averaging about 380.

The polydimethylsiloxane (I) can be completely hydroxyl terminated or a portion of the polymer chains can be terminated on one end by a methyl radical. Generally to be useful in the release compositions of this invention, no more than about 20 percent of the polymer chains should be terminated on one end by a methyl radical. It is preferred that siloxane (I) is hydroxyl terminated and that all Y groups in the general formula are hydroxyl radicals.

The alkoxysilanes used in the release compositions of this invention are represented by the general formula $(RO)_nSiR'_{4-n}$

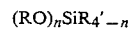

wherein R is a methyl, ethyl, propyl or methoxyethyl radical, R' is a monovalent hydrocarbon or halogen substituted hydrocarbon radical having from 1 to 4 carbon atoms, and n has a value of 3 or 4. Thus specific examples of alkoxysilanes which can be used are methyltrimethoxysilane, methyltriethoxysilane, propyltrimethoxysilane, chloropropyltrimethoxysilane, 3,3,3-trifluororpropyltrimethoxysilane, methyltris(methoxyethoxy)silane, butyltrimethoxysilane, methylorthosilicate, ethylorthosilicate and propylorthosilicate. In addition to the monomeric alkoxysilanes, oligomeric products from partial hydrolysis and condensation of the alkoxysilanes can also be used in the release compositions of this invention. For example, methyl polysilicate, dimethyltetramethoxydisiloxane, and ethyl polysilicate can be employed.

Generally, it is preferred to employ methyltrimethoxysilane in the mold release compositions of this invention because compositions containing the methyltrimethoxysilane have excellent storage stability and produce cured films with good durability and toughness such that many successive mold releases can be obtained without recoating.

The mold release compositions employed in the method of this invention contain a metal alkoxide curing accelerator. Metal alkoxides useful in this invention are selected from the group consisting essentially of tetraalkyltitanates, tetraalkylgermanates, tetraalkylzirconates and vanadium trialkoxide oxides. Metal alkoxides in which the alkyl group contains up to about 18 carbon atoms are useful. For example, useful titanium alkoxides include, among others, tetrabutyltitanate, tetra(2-ethylhexyl)titanate, tetraoctadecyltitanate and tetraisopropyl titanate. Other useful metal alkoxides include germanium alkoxides such as tetrabutylgermanate and tetraoctylgermanate, zirconium alkoxides such as tetraisopropylzirconates and tetraoctylzirconate, and vanadium alkoxide oxides such as vanadium tri(n-propoxide) oxide and vanadium tributoxide oxide.

The titanium alkoxides are preferred as curing accelerators because of their ready availability and because mold release compositions containing the titanates generally provide a greater number of successive releases of articles from treated molds. An especially preferred titanate is the tetra(2-ethylhexyl)titanate which is commercially available and provides fast curing coatings with excellent release characteristics.

The mold release compositions of this invention also contain an organic solvent. The purpose of the organic solvent is to reduce the viscosity of the composition and facilitate application to the shape-determining surfaces of the mold. Solvents which are to some extent hydrophobic are additionally advantageous because they facilitate the exclusion of moisture from the compositions and help prevent premature curing during storage.

Any organic solvent that is non-reactive with the other components and is sufficiently volatile to evaporate rapidly when the composition is applied to the mold surface can be employed in this invention. Generally, the preferred solvents have normal boiling points below about 150° C. The preferred solvent for use in any particular molding operation will depend on whether the mold release composition is to be applied to molds at room temperature or at elevated temperatures. When room temperature molds are coated a lower boiling solvent is generally preferred. On the other hand it is advantageous to use higher boiling solvents when elevated temperature molds are coated.

The organic solvent should be substantially water free to avoid premature curing of the composition. Preferred organic solvents include, for example, aliphatic hydrocarbons, cycloaliphatic hydrocarbons, aromatic hydrocarbons and chlorinated hydrocarbons. Commercial mixtures such as white spirit, mineral spirits, and naphtha are also quite suitable. Further examples of useful solvents include cyclohexane, toluene, xylene, methylene dichloride, ethylene dichloride, carbon tetrachloride, chloroform and perchloroethylene. Other solvents such as acetone, methylethylketone, ethyl acetate and tetrahydrofuran, and dioxane can also be used, but are less preferred because of their somewhat more hydrophilic character.

Since the solvent is non-reactive, it can be employed in the compositions in essentially any proportion. Generally, it has been found that compositions containing about 50 percent to 90 percent by weight solvent are advantageous because they are easy to apply to the mold surfaces to provide films of appropriate thickness with good permanence.

The proportions of polydimethylsiloxanes, alkoxysilane compounds and metal alkoxide may vary within fairly wide limits. Useful mold release compositions can be prepared containing 25 to 98 parts of polydimethylsiloxane, 1.5 to 65 parts of alkoxysilane compounds, and 0.3 to 18 parts of metal alkoxide. The proportions are to be understood to be by weight in relation to 100 parts by weight of coating components i.e. the combined weight of polydimethylsiloxane, alkoxysilane compounds, and metal alkoxides in the composition. It is preferred that the mold release compositions contain 50 to 80 parts polydimethylsiloxane, 10 to 30 parts alkoxysilane compounds, and 2 to about 7 parts of the metal alkoxide. These preferred compositions cure rapidly when applied to molds because of the relatively high level of metal alkoxide curing accelerator but still exhibit a high degree of permanence which provides numerous successive releases from the mold without reapplication of the release composition. These compositions are especially advantageous in molding operations where a series of molds are employed successively with only limited time periods available between uses to apply and cure the release composition.

The curable mold release composition may further contain additional components which do not adversely interfer with the curing of the composition or its use as a release agent, such as a colorant to aid in its application to a mold surface.

The silicone mold release composition is prepared by mixing the solvent and the desired amounts of the three coating components with any additional components in any suitable manner such as by stirring, blending and or tumbling. While it is not usually necessary to employ any extraordinary procedures to exclude moisture during the mixing, normal care should be exercised to prevent any significant exposure to water. It is preferred to mix the polydimethylsiloxane and alkoxysilane in the solvent first and then add the metal alkoxide. This sequence minimizes any thickening that can occur when siloxane and metal alkoxide are combined without solvent present. The nature of the products formed by mixing the three ingredients in the absence of moisture is not precisely known. However, it is believed that the alkoxy groups on the silane react with the hydroxyl groups of the hydroxylated siloxane, with the elimination of an alcohol, to produce polyfunctional alkoxy endblocked polysiloxanes. It should be understood, however, that applicant is not limiting this invention to the production of this particular type of structure but it is entirely possible that far more complicated structures are produced and that other mechanisms may be involved in which the metal alkoxide participates in the initial reaction.

The compositions are stable when mixed in solvent and can be stored for extended periods in containers that exclude moisture. These compositions need not be mixed just prior to use and consequently are more convenient and economical to use than two part systems.

The curable silicone release composition may be applied to a shape-determining surface of a mold by any suitable method such as by spraying, brushing or rolling. The composition of said surface is not critical and may be metal, wood, polyester, epoxy, etc. To ensure proper curing and adhesion of the curable silicone release composition the surface to which it is applied should be clean.

After being applied, the curable silicone release composition is allowed to cure and any volatile thinning medium is allowed to evaporate. The curing and evaporation may be accelerated by the application of moist heat to the applied composition, but it is not necessary.

The process of this invention is applicable to open-mold or closed-mold molding processes and to molding processes which use solid molding compositions, such as thermoformable powders and blanks or liquid molding compositions which are convertible to the solid state by any means, such as by a chemical curing reaction or by simple cooling of a molten composition, such as wax, polyethylene or low-melting metals.

The improvement of this invention is particularly valuable in a molding process wherein a liquid organic molding composition is converted to the solid state by a chemical reaction, such as by a reaction involving isocyanate radicals which is used to provide polyurethane articles such as polyurethane elastomers and high resiliency polyurethane foams or by a reaction involving free radicals which is used to provide polyester articles such as boat hulls. These chemically hardened molding compositions are readily released from a mold that has been treated by the process of this invention.

In the improved process of this invention at least one shape-determining surface of the mold is coated with the curable silicone release composition. For example, in a two-surfaced mold, such as a closeable mold, one surface of the mold may be coated as described herein and the other surface may be left uncoated or may be coated by another process, thereby providing surfaces having different release forces. Differential release of molded articles produced therein is thereby obtained. Preferably, all the shape-determining surfaces of the mold are coated by the process of this invention. In addition, any other portions of the mold such as flashing areas, injection conduits and risers, or portions thereof, may be treated in the process of this invention, if desired.

The curable silicone release compositions which are used in the process of this invention are uniquely suited for a commercial molding process because they are easily applied, they cure rapidly at relatively low temperature and they have physical properties which provide for the multiple use of the mold with one coating of the mold.

The process of this invention is particularly useful in a continuous molding process wherein a plurality of hot molds are sequentially charged with a molding composition, the charged composition is converted to a molded article and the molded article is separated from the hot mold, thereby allowing the mold to be refilled with molding composition. In such a continuous process a mold to be treated by the process of this invention may be sprayed with the curable silicone release composition, instead of being charged with the molding composition, and the applied release composition is cured during the time interval when the charged mold would normally be in the conversion and/or demolding stage. The treated mold is then ready for charging during the next sequence. In this molding process the process of this invention is advantageous because the curable silicone release composition cures rapidly when applied to a shape-determining surface of the hot mold and because the cured silicone release composition has sufficient abrasion-resistance and adhesion to the mold surface to permit the molding of several articles after one application of the curable silicone release composition.

Furthermore, the curable silicone release compositions that are used in the improved process of this invention are particularly useful in a molding process which uses "cold-molded" polyurethane compositions. In such a process a mold is heated to and maintained at approximately 60° C. for the entire molding process. To take full advantage of a continuous "cold-mold" molding process the process of this invention provides for a curing of the silicone release composition at the operating temperature of the molding process, in one cycle, and does not require a separate heating step.

The following examples are illustrative only and should not be construed as limiting the invention which is properly set forth in the appended claims. For this disclosure all viscosities were measured at 25° C. and all parts, percentages and ratios are by weight unless otherwise indicated.

EXAMPLE 1

Mold release coating formulations were prepared by mixing the coating components in substantially anhydrous methylene chloride solvent. The siloxane polymer, methyltrimethoxysilane and tetra(2-ethylhexyl)-titanate were added in the amounts indicated in Table 1 to about 900 g of the solvent. The siloxane polymer in formulations A and B is a high molecular weight, hydroxy terminated polydimethylsiloxane characterized as a gum with a plasticity number of about 150 and an average value for k of about 3,400. The siloxane polymers of formulations C through F are hydroxy terminated polydimethylsiloxanes with viscosities as indicated in the table. The siloxane with 55,000 cs viscosity has an average value for k of about 860, and the siloxane with 60 cs viscosity has an average value for k of about 31.

The mold release formulations were applied to aluminum panels from the methylene chloride solutions. The coatings all cured at room temperature upon exposure to atmospheric moisture. The coatings were generally tackfree in less than 5 minutes and were fully cured within 20 to 30 minutes. All the panels coated with these formulations allowed at least 2 releases of a two-part castable urethane used to produce high resiliency foam articles. Without a release coating, the same polyurethane adhered to the aluminum panels.

TABLE 1

| For-mulation | Viscosity of Polysiloxane | Composition | | |
|---|---|---|---|---|
| | | Siloxane Polymer | $CH_3Si(OCH_3)_3$ | Titanate |
| A | Gum | 96 | 2 | 2 |
| B | " | 91 | 4.5 | 4.5 |
| C | 55,000 | 96 | 2 | 2 |
| D | " | 91 | 4.5 | 4.5 |
| E | 60 | 96 | 2 | 2 |

TABLE 1-continued

| Formulation | Viscosity of Polysiloxane | Composition | | |
|---|---|---|---|---|
| | | Siloxane Polymer | CH$_3$Si(OCH$_3$)$_3$ | Titanate |
| F | " | 91 | 4.5 | 4.5 |

EXAMPLE 2

This example illustrates mold release coating formulations of this invention containing relatively high proportions of the trialkoxyorganosilane.

Mold release coating formulations were prepared in substantially anhydrous methylene chloride by mixing siloxane polymer, methyltrimethoxysilane, and tetra(2-ethylhexyl)titanate in the amounts indicated in Table 2. The siloxane polymer in formulations J, K and L is characterized as a polydimethylsiloxane of about 12,500 centistoke viscosity in which about 92.5 percent of the terminal groups are hydroxy and 7.5 percent of the terminal groups are trimethylsilyl. The siloxane polymers in formulations G, H, I, M, N, and O are hydroxy terminated polydimethylsiloxanes with various degrees of polymerization as indicated in the table.

The mold release formulations were applied to aluminum panels and the release properties tested as in Example 1. All the panels coated with these formulations allowed at least 2 releases of polyurethane castings.

TABLE 2

| Formulation | Average Value of k | Composition (g) | | |
|---|---|---|---|---|
| | | Siloxane Polymer | CH$_3$Si(OCH$_3$)$_3$ | Titanate |
| G | 31 | 60.6 | 30.3 | 9.1 |
| H | 31 | 45.45 | 45.45 | 9.1 |
| I | 31 | 30.3 | 60.6 | 9.1 |
| J | 560 | 60.6 | 30.3 | 9.1 |
| K | 560 | 45.45 | 45.45 | 9.1 |
| L | 560 | 30.3 | 60.6 | 9.1 |
| M | 860 | 60.6 | 30.3 | 9.1 |
| N | 860 | 45.45 | 45.5 | 9.1 |
| O | 860 | 30.3 | 60.6 | 9.1 |

EXAMPLE 3

This example illustrates mold release coating formulations of this invention containing the preferred siloxane polymer component.

Mold release coating formulations were prepared in substantially anhydrous methylene chloride by mixing siloxane polymer, methyltrimethoxysilane, and tetra(2-ethylhexyl)titanate in the amounts indicated in Table 3. The siloxane polymer in these formulations is a mixture of 85 percent by weight of hydroxy terminated polydimethylsiloxane with a viscosity of about 4,000 centistokes and 15 percent by weight of hydroxy terminated polydimethylsiloxane with a viscosity of about 60 centistokes. The siloxane with 4,000 cs viscosity has an average value for k of about 380 and the siloxane with 60 cs viscosity has an average value for k of about 31.

The mold release formulations were applied to aluminum panels and the release properties tested as in Example 1. All the panels coated with these formulations allowed at least 2 releases of the polyurethane casting.

TABLE 3

| Formulation | Composition (g) | | |
|---|---|---|---|
| | Siloxane Polymer | CH$_3$Si(OCH$_3$)$_3$ | Titanate |
| P | 88.6 | 2.3 | 9.1 |
| Q | 86.4 | 4.5 | 9.1 |
| R | 84.1 | 6.8 | 9.1 |
| S | 81.8 | 10.1 | 9.1 |
| T | 77.3 | 15.6 | 9.1 |
| U | 72.7 | 18.2 | 9.1 |
| V | 63.6 | 27.3 | 9.1 |
| W | 60.9 | 30.4 | 8.7 |
| X | 54.5 | 36.4 | 9.1 |

EXAMPLE 4

This example is presented for comparison and shows similar silicone formulations which cure at room temperature upon exposure to atmospheric moisture but do not provide release for urethane foam castings. These formulations are outside the scope of this invention.

Coating formulations were prepared in substantially anhydrous methylene chloride by mixing siloxane polymer, methyltrimethoxysilane, and as catalyst, bis(ethylacetoacetyl)diisopropyltitanate in the amounts indicated in Table 4. The siloxane polymer in these formulations is the same as that employed in Example 3. The catalyst in these formulations is a titanium chelate in contrast to the titanium tetraalkoxide used in Example 3.

The coating formulations were applied to aluminum panels by the same procedure used in Example 1. The coatings cured at room temperature upon exposure to atmospheric moisture very much like the coatings of prior Examples 1, 2 and 3. However, when the coated panels were tested for release of polyurethane foam as in Example 1, the polyurethane was found to adhere to the coated panels.

TABLE 4

| Formulation | Compositions (g) | | |
|---|---|---|---|
| | Siloxane Polymer | CH$_3$Si(OCH$_3$)$_3$ | Titanate |
| Y | 87 | 8.7 | 4.3 |
| Z | 76.9 | 15.4 | 7.7 |
| AA | 69 | 20.7 | 10.3 |

EXAMPLE 5

This example compares the mold release provided by a coating of this invention with the mold release provided by a coating of a typical organic wax based release agent that is presently used in molding polyurethane.

One half of an aluminum panel was coated with Formulation W from Example 3. The other half of the panel was coated with Brulin Perma Mold* 804-07SH, an organic wax based release agent manufactured by Brulin & Co., Indianapolis, Ind. 46206. The panel was tested for release of a urethane foam formulation. The silicone coated half easily released five successive foam castings without any foam adhering to the panel. The wax coated half had some foam adhering after the first foam casting was removed. Additional polyurethane foam then adhered to these spots with each release.

Foams released from the wax were rough, dull and contained many air pockets up to 5 mm diameter. Foams released from the silicone half were smooth, glassy and contained only a few air pockets with the largest only 2 mm diameter.

EXAMPLE 6

This example illustrates the permanence of a preferred mold release coating of this invention.

The inside of a box-shaped, aluminum mold was coated with release formulation W from Example 3. Successive castings of high resiliency polyurethane foams were made in the mold. The coated mold successfully released 43 castings before testing was stopped.

EXAMPLE 7

This example illustrates the use of compositions of this invention to release cured epoxy and polyester resins.

Half of a glass microscope slide was coated with a solvent solution of Formulaton W from Example 3. The coating was allowed to cure at room temperature. A bisphenol A epoxy resin catalyzed with tetraethylene pentamine was cured on the glass slide. The epoxy resin easily released from the coated side of the glass slide but was tightly adhered to the uncoated side.

Paraplex ® P-43, an unsaturated polyester resin manufactured by Rohm & Haas Co., Philadelphia Pa. 19105, was catalyzed with benzoyl peroxide and heat cured on a glass slide half coated with Formulation W as described above. The cured polyester released from the coated half but tightly adhered to the uncoated half of the glass slide.

EXAMPLE 8

This example shows the various levels of titanate catalyst that can be employed in the compositions of this invention.

Mold release coating formulations were prepared by mixing the coating components in substantially anhydrous methylene chloride or naphtha solvents. The compositions contained 20 g of the siloxane polymer mixture described in Example 3, 5 g of methyltrimethoxysilane, and various amounts of tetra(2-ethylhexyl)titanate as indicated in Table 5. The compositions were applied to aluminum panels from solutions of either 25 percent by weight coating components in methylene chloride or 33 percent by weight coating components in naphtha solvent. The coatings containing titanate levels of 3.8 percent and above cured at room temperature within 20-30 minutes of exposure to atmospheric moisture. Coatings with lower levels of titanate cured but required a longer time (i.e. >45 minutes).

After the coatings had cured, successive high resiliency polyurethane foam castings were made in contact with each panel. The number of releases achieved with each level of titanate catalyst is shown in Table 5.

TABLE 5

Release Properties with Different Levels of Tetra(2-ethylhexyl)titanate

| Tetra(2-ethylhexyl)titanate | | |
|---|---|---|
| Grams | Percent of Coating Components | Number of Releases |
| 0.125 | 0.5 | >16 |
| 1.00 | 3.8 | >16 |
| 1.25 | 4.8 | >16 |
| 2.5 | 9.1 | 15 |
| 3.75 | 13.0 | 13 |
| 5.00 | 16.6 | 13 |

EXAMPLE 9

This example compares the release properties of coatings prepared from siloxane polymers with varying degrees of polymerization.

Mold release coating compositions were prepared by mixing, in substantially anhydrous solvent, 20 g of siloxane polymer, 5 g of methyltrimethoxysilane and 2.5 g of tetra(2-ethylhexyl)titanate. The siloxane polymers are hydroxy terminated polydimethylsiloxanes with viscosities and average degrees of polymerization as indicated in Table 6. The compositions were applied to aluminum panels and the number of releases provided by the coatings determined as described in Example 8. The results are presented in Table 6.

TABLE 6

Release Properties Using Siloxane Polymers with Different Degrees of Polymerization

| Siloxane Polymer | | |
|---|---|---|
| Viscosity (cs) | Average Value of k | Number of Releases |
| 4,000 | 380 | 7 |
| 60 | 31 | 16 |
| 2,500 | Blend* | 16 |
| 39 | 12 | 0 |

*A mixture of 85% siloxane with an average k value of about 380 and 15% siloxane with an average k value of about 31

EXAMPLE 10

This example compares the release properties of coatings prepared with several different siloxane condensation catalysts.

Mold release coating compositions were prepared in substantially anhydrous solvent by mixing 20 g of the siloxane polymer mixture described in Example 3, 5 g of methyltrimethoxysilane, and 1.0 g of the metal catalyst. The compositions were applied to aluminum panels as described in Example 8. Each coating cured upon exposure to atmospheric moisture except for the composition containing dodecylbenzenesulfonic acid. The number of releases provided by the cured coatings was determined as in Example 8 and is shown in Table 7.

The mold release coating compositions were stored at room temperature in tightly sealed bottles. After 1 month, there was no visible change in the compositions containing titanate catalysts, but the composition containing dibutyltindilaurate was completely cured in the bottle.

TABLE 7

| Release Properties with Different Catalysts | |
|---|---|
| Catalyst | Number of Releases |
| bis(acetylacetonyl)diisopropyltitanate* | 0 |
| tetraisopropytitanate | 8 |
| tetra(2-ethylhexyl)titanate | >16 |
| bis(ethylacetoacetyl)diisopropyltitanate* | 0 |
| dodecylbenzenesulfonic acid* | No cure |
| dibutyltindilaurate* | 9 |

*Presented for comparison purposes, not within the scope of this invention

EXAMPLE 11

This example illustrates a siloxane coating composition containing phenyltrimethoxysilane instead of methyltrimethoxysilane. The composition forms a cured silicone coating, but it does not provide sufficient release for polyurethane foam and is not within the scope of this invention.

A coating composition was prepared in substantially anhydrous solvent by mixing 20 g of the siloxane polymer mixture described in Example 3, 7.4 g of phenyltrimethoxysilane, and 2.5 g of tetra(2-ethylhexyl)titanate. The composition was applied to an aluminum panel from solvent as described in Example 8. The composition cured at room temperature upon exposure to atmospheric moisture. The coated panel failed to release a casting of the same high resiliency polyurethane foam employed in the release tests of Example 8.

EXAMPLE 12

This example shows additional alkyltrialkoxysilanes that can be employed in the mold release compositions of this invention.

Two mold release compositions were prepared in substantially anhydrous solvent by mixing 4 g of the siloxane polymer mixture described in Example 3, 0.5 g of tetra(2-ethylhexyl)titanate, and either 0.83 g of propyltrimethoxysilane or 0.63 g of trifluoropropyltrimethoxysilane. The compositions were applied to aluminum panels and tested for release against polyurethane foam as described in Example 8. Each coating provided 3 releases, but failed to release the fourth casting.

EXAMPLE 13

This example shows release compositions of this invention containing germanium, vanadium and zirconium alkoxides.

Mold release coating compositions were prepared in substantially anhydrous solvent by mixing 4 g of the siloxane polymer mixture described in Example 3, 1 g of methyltrimethoxysilane, and 0.5 g of a metal alkoxide. The compositions were applied to aluminum panels from solvents and the number of releases provided by the cured coatings was determined as in Example 8. The results are shown in Table 8.

TABLE 8

| Release Properties with Metal Alkoxide Catalysts | |
| --- | --- |
| Catalyst | Number of Releases |
| Tetrabutylgermanate | 5 |
| Vanadium tri(n-propoxide)oxide | 3 |
| Tetraoctylzirconate | 2 |

EXAMPLE 14

This example illustrates the use of ethylorthosilicate and ethyl polysilicate in the mold release compositions of this invention.

Two mold release compositions were prepared by combining 40 g of substantially anhydrous naphtha solvent, 9 g of the siloxane polymer mixture described in Example 3, 0.5 g of tetra(2-ethylhexyl)titanate, and 1 g of either ethyl orthosilicate or ethyl polysilicate. The compositions were applied to aluminum panels and tested for release against polyurethane foam as described in Example 8. The coating containing ethyl polysilicate provided 5 successive releases, but failed to release on the 6th molding of polyurethane. The coating containing ethyl orthosilicate provided 10 successive released at which time the testing was stopped.

That which is claimed is:

1. In a method for molding articles comprising placing a molding composition in a mold, converting the molding composition to a solid molded article and thereafter separating the solid molded article from the mold, the improvement comprising applying a silicone mold release composition to at least one shape-determining surface of the mold, and thereafter curing the silicone mold release composition before the molding composition is placed in contact therewith, wherein the silicone mold release composition is stable if stored in containers that exclude moisture, cures when exposed to moisture, and is obtained by mixing components consisting essentially of (I) a polydimethylsiloxane represented by the general formula $Y[(CH_3)_2SiO]_kH$ in which Y is a methyl or hydroxyl radical with the stipulation that at least 80 percent of Y are hydroxyl radicals and k has an average value greater than 20;

(II) an alkoxysilane represented by the general formula $(RO)_nSiR'_{4-n}$ wherein R is a methyl, ethyl, propyl or methoxyethyl radical, R' is a monovalent hydrocarbon radical or halogenated hydrocarbon radical having 1 to 4 carbon atoms, and n has a value of 3 or 4;

(III) a metal alkoxide selected from the group consisting of tetraalkyltitanates, tetraalkylgermanates, tetraalkylzirconates and vanadium trialkoxide oxides; and (IV) a non-reactive, volatile organic solvent which is substantially water free, the components being mixed in amounts of 25 to 98 parts by weight of (I), 1.5 to 65 parts by weight of (II), and 0.3 to 18 parts by weight of (III) for every 100 parts by weight of (I) plus (II) plus (III).

2. A method for molding articles according to claim 1 wherein Y is a hydroxyl radical.

3. A method for molding articles according to claim 2 wherein the polydimethylsiloxane is a mixture of siloxanes consisting essentially of 5 to 40 percent by weight of siloxane having an average value of k of 25 to 75 and 60 to 95 percent by weight of siloxane having an average value of k of 300 to 1000.

4. A method for molding articles according to claim 1 wherein the metal alkoxide is a tetraalkyltitanate.

5. A method for molding articles according to claim 4 wherein the organic solvent is selected from the group consisting of aliphatic hydrocarbons, cycloaliphatic hydrocarbons, aromatic hydrocarbons and chlorinated hydrocarbons.

6. A method for molding articles according to claim 5 wherein the mold release composition contains 50 to 80 parts by weight of polydimethylsiloxane, 10 to 30 parts by weight of alkoxysilane, and 2 to 7 parts by weight of metal alkoxide for every 100 parts by weight of (I) plus (II) plus (III).

7. A method for molding articles according to claim 6 wherein n is 3, R' is a methyl radical and the alkyl groups of the tetraalkyltitanate contain from 1 to 18 carbon atoms per alkyl group.

8. A method for molding articles according to claim 7 wherein the alkoxysilane is methyltrimethoxysilane and the tetraalkyltitanate is tetra(2-ethylhexyl)titanate.

* * * * *